May 12, 1931.  C. W. OLD  1,804,477
FIRE EXTINGUISHER
Filed Dec. 7, 1926
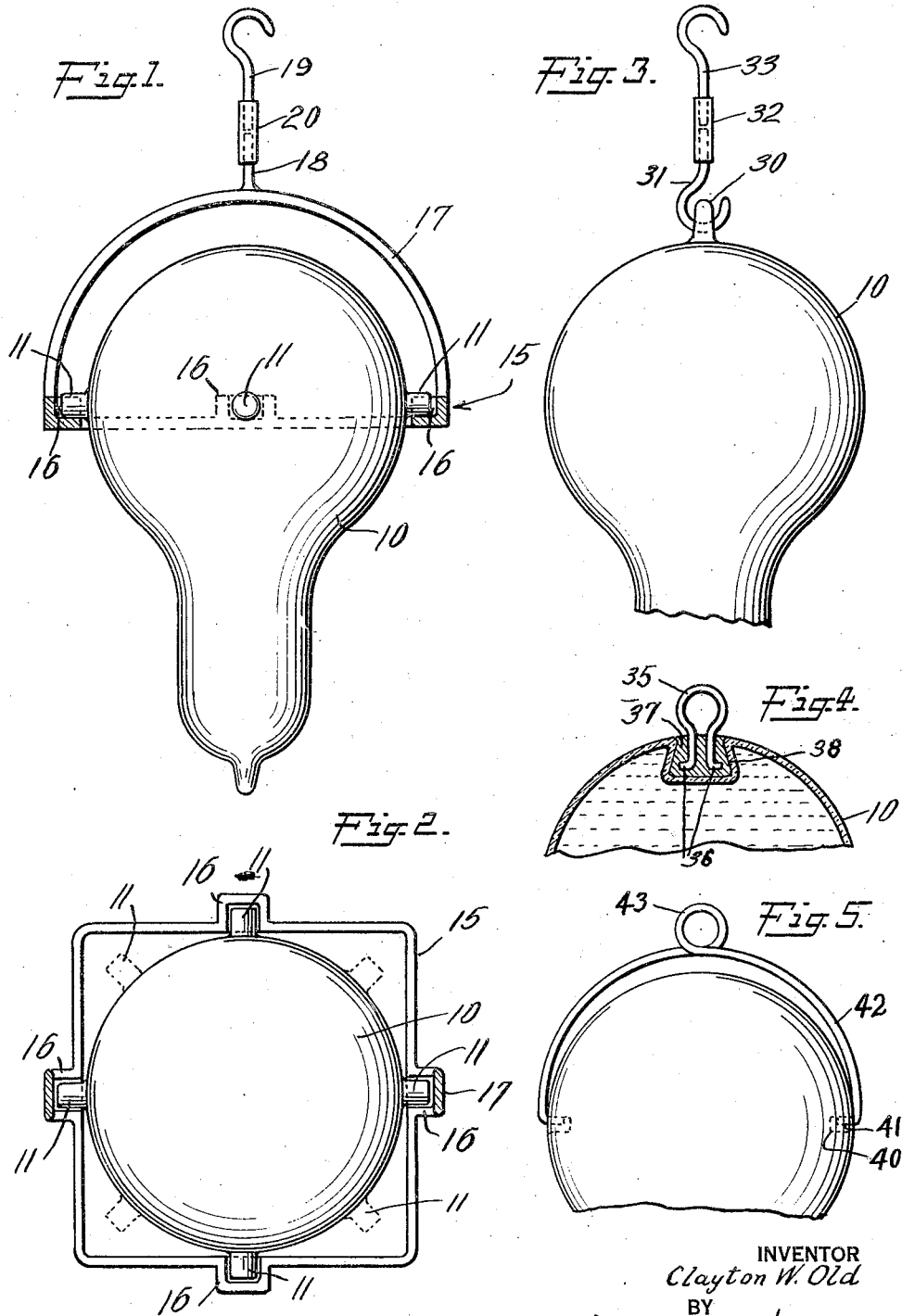
INVENTOR
Clayton W. Old
BY
Marshall & Hawley
ATTORNEYS Patented May 12, 1931

1,804,477

UNITED STATES PATENT OFFICE

CLAYTON W. OLD, OF MONTCLAIR, NEW JERSEY, ASSIGNOR TO INTERNATIONAL FIRE EQUIPMENT CORPORATION, OF NEW YORK, N. Y., A CORPORATION OF DELAWARE

FIRE EXTINGUISHER

Application filed December 7, 1926. Serial No. 153,072.

This invention relates to fire extinguishers.

More particularly stated, the invention relates to the grenade type of fire extinguisher and to a holder or support for the grenade.

Another object of the invention is to provide a support or holder for a grenade so constructed and arranged that the grenade will be releasably held against accidental deplacement or removal from the support.

Another object of the invention is to provide a bracket or holder for grenades comprising few parts and a structure that can be economically manufactured.

Further objects of the invention will appear from the following specification taken in connection with the drawings, which form a part of this application, and in which Fig. 1 is an elevational view partly in section of a device constructed in accordance with the invention;

Fig. 2 is a plan view partly in section of the structure shown in Fig. 1;

Fig. 3 is an elevational view showing another embodiment of the invention;

Fig. 4 is a sectional elevation partly in section showing a slightly modified form of the structure shown in Fig. 3; and Fig. 5 is an elevational view partly broken away showing a modification of the structure shown in Fig. 1.

The invention briefly described consists of the combination of a frangible container or grenade and a member or frame engaging a projection or projections on the container and supported by means including a fusible connection. In the form of the invention shown in Fig. 1, the container has laterally projecting lugs formed thereon and these lugs rest on the frame which is supported through the fusible connection. In Fig. 2 the container has an eye or loop formed thereon and the supporting means engages the loop and is in turn supported by a fusible connection. Figs. 4 and 5 show still further modifications of the invention illustrated in Figs. 1 and 3. Further details of the invention will appear from the following description.

In the embodiment of the invention illustrated in Figs. 1 and 2 there is shown a frangible grenade or container 10. This container is used for fire extinguishing purposes and is preferably filled with carbon tetrachloride or some other suitable fluid adapted to extinguish fires. The container 10 has formed thereon or secured thereto a plurality of laterally projecting lugs 11.

The container is supported in a suitable frame such as the frame 15 having extensions or pockets 16 in which the lugs 11 are adapted to seat. In order to position the container in the frame, the frame is placed over the container with the lugs of the container positioned as shown in dotted lines in Fig. 2. The frame and container are then relatively moved so that the lugs will be positioned over the extensions 16 of the frame and will rest therein. The frame 15 is supported by a bail 17. In Fig. 1 the bail is shown as having a projection 18 which is connected to a hook or other suitable suspending member 19 through a fusible connection 20.

When the hook 19 is supported on a bracket, loop or eye and the container is positioned in the frame 15, it will be evident that in case of fire, the container and frame will drop when the temperature of the room rises to a predetermined degree.

In the form of the invention shown in Fig. 3, an eye or loop 30 is formed on the upper end of the container 10 and is engaged by a hook 31 which in turn is connected through a fusible connection 32 to a hook 33. The hook 33 is supported by an eye, loop or suitable bracket. When the temperature of the room in which this container is placed rises to a predetermined degree, the fusible connection 32 will release the hook 31 and the container 10. The container will then drop and be broken and release the fire extinguishing fluid, thus extinguishing the fire.

Fig. 4 shows a structure similar to that shown in Fig. 3. In this last embodiment, however, the eye or loop 35 has its lower end 36 embedded in cement or other suitable material in a recess 37 formed in the upper end of the container or grenade 10.

In Fig. 5 the grenade 10 is provided with inwardly extending offset portions or projections 40 which receive inturned ends 41 of a supporting bail or frame 42. The bail is preferably resilient and has an eye 43 at its upper end.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A fire extinguisher and support therefor comprising in combination, a frangible fire extinguisher container having projections formed thereon extending laterally from the outer surface thereof, and a frame encircling said container and having sockets adapted to receive said projections, said container having an elongated portion extending downwardly through said support.

2. In combination, a frangible container having projections formed thereon extending laterally from the outer surface thereof, a frame encircling said container and having sockets adapted to receive said projections, and means including a fusible element for supporting said frame.

3. A fire extinguisher and support therefor comprising in combination, a frangible fire extinguisher container having projections formed thereon extending laterally from the outer surface thereof, and a frame encircling said container and having offset sockets adapted to receive said projections, said container having an elongated portion extending downwardly through said support.

4. In combination, a frangible container having laterally offset portions, a frame having portions adapted to engage and support said offset portions and having other portions adapted to permit the passage therethrough of said offset portions.

5. In combination, a frangible container having laterally extending lugs, a frame having portions adapted to engage and support said lugs and having other portions adapted to permit the passage therethrough of said lugs.

6. In combination, a frangible container having laterally extending lugs, a frame having sockets adapted to engage and support said lugs and having other portions adapted to permit the passage therethrough of said lugs.

7. In combination, a frangible container having projections thereon extending laterally therefor, and means having portions engaging and supporting said projections and having other portions adapted to permit the vertical passage of said projections through the frame.

8. In combination, a frangible container having projections thereon extending laterally therefrom, means having portions engaging and supporting said projections and having other portions adapted to permit the vertical passage of said projections through the frame, and means including a fusible part for supporting said frame.

9. In combination, a frangible container having projections extending laterally from the outer surface thereof, a frame surrounding the container and having portions engaging and supporting said container projections and having other portions angularly displaced from said portions adapted to permit the passage of the projections therethrough.

In witness whereof, I have hereunto set my hand this 1st day of December, 1926.

CLAYTON W. OLD.